United States Patent
Li et al.

(10) Patent No.: US 8,243,648 B2
(45) Date of Patent: Aug. 14, 2012

(54) SPATIAL REUSE TECHNIQUES WITH WIRELESS NETWORK RELAYS

(75) Inventors: Qinghua Li, Sunnyvale, CA (US);
Xintian Eddie Lin, Mountain View, CA (US); Hujun Yin, San Jose, CA (US);
Jaroslaw J Sydir, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 797 days.

(21) Appl. No.: 12/317,188

(22) Filed: Dec. 19, 2008

(65) Prior Publication Data

US 2010/0157875 A1 Jun. 24, 2010

(51) Int. Cl.
- *H04B 7/14* (2006.01)
- *H04W 72/04* (2009.01)
- *H04W 72/12* (2009.01)

(52) U.S. Cl. ........ 370/315; 370/293; 370/329; 370/348; 455/7; 455/452.1

(58) Field of Classification Search .................. 370/279, 370/293, 315, 329, 341, 348, 328, 338; 455/7, 455/447, 450, 452.1
See application file for complete search history.

(56) References Cited

U.S. PATENT DOCUMENTS

| | | | |
|---|---|---|---|
| 7,742,448 B2 * | 6/2010 | Ramachandran et al. | 370/329 |
| 7,917,149 B2 * | 3/2011 | Chen et al. | 455/450 |
| 8,155,015 B2 * | 4/2012 | Maltsev et al. | 370/252 |
| 2006/0109865 A1 * | 5/2006 | Park et al. | 370/482 |
| 2007/0081483 A1 * | 4/2007 | Jang et al. | 370/315 |
| 2007/0155315 A1 * | 7/2007 | Lee et al. | 455/11.1 |
| 2008/0043817 A1 * | 2/2008 | Beems Hart et al. | 375/135 |
| 2008/0107063 A1 | 5/2008 | Oleszczuk | |
| 2008/0181167 A1 | 7/2008 | Sydir et al. | |
| 2008/0181318 A1 * | 7/2008 | Kim et al. | 375/260 |
| 2008/0219229 A1 * | 9/2008 | Zheng | 370/338 |
| 2008/0220790 A1 * | 9/2008 | Cai et al. | 455/450 |
| 2009/0073916 A1 * | 3/2009 | Zhang et al. | 370/315 |
| 2009/0247172 A1 * | 10/2009 | Palanki et al. | 455/447 |
| 2009/0279587 A1 * | 11/2009 | Eriksson et al. | 375/133 |
| 2009/0303918 A1 * | 12/2009 | Ma et al. | 370/315 |

(Continued)

FOREIGN PATENT DOCUMENTS

EP 1575318 A2 * 9/2005

(Continued)

OTHER PUBLICATIONS

Adaptive Frame Structure for Mobile Multihop Relay (MMR) Networks, Teo et al, IEEE 2007, 5 pages.*
International Preliminary Report on Patentability mailed Jun. 30, 2011 issued in International Application No. PCT/US2009/066923.

*Primary Examiner* — Chi Pham
*Assistant Examiner* — Ahmed Elallam
(74) *Attorney, Agent, or Firm* — Schwabe, Williamson & Wyatt, P.C.

(57) ABSTRACT

In various embodiments of the invention, a relay station in a wireless communications network may communicate with one or more subscriber stations at the same time and/or on the same frequency that the associated base station is communicating with another relay station in the same network. This contrasts with the conventional technique of devoting one time period or frequency exclusively to communications between the base station and the relay stations, and devoting another time period or frequency exclusively to communications between the relay stations and the subscriber stations.

32 Claims, 10 Drawing Sheets

U.S. PATENT DOCUMENTS

2010/0035620 A1* 2/2010 Naden et al. .................. 455/450
2010/0054171 A1* 3/2010 Zhu et al. ...................... 370/315
2010/0118996 A1* 5/2010 Sundaresan et al. .......... 375/260
2010/0120442 A1* 5/2010 Zhuang et al. ................ 455/450
2010/0136998 A1* 6/2010 Lott et al. ..................... 455/453
2011/0165834 A1* 7/2011 Hart et al. ........................ 455/7

FOREIGN PATENT DOCUMENTS

| EP | 1677443 A1 * | 7/2006 |
| JP | 2006246002 A | 9/2006 |
| KR | 20070042224 A | 4/2007 |
| KR | 20080001229 A | 1/2008 |

* cited by examiner

SPATIAL REUSE TECHNIQUES WITH WIRELESS NETWORK RELAYS

BACKGROUND

In wireless network systems that use relay stations (e.g., such as those described by the IEEE standard 802.16j or m), a single base station (BS) may communicate separately with multiple relay stations (RS), each of which may then communicate separately with one or more subscriber stations (SS), rather than having a direct communication between the BS and a given SS. The allocation of communication resources in these networks is typically very structured: one time period is devoted to transmissions from the BS to the RS's, another time period devoted to transmissions from the RS's to the SS's, another to transmissions from the SS's to the RS's, and another to transmissions from the RS's to the BS. In a network using time domain sharing, all the downlink transmissions from the BS to the RS's are distributed in time, with communication between the BS and only a single RS possible at any given time. This means that all but one of the RS's will be idle at any given time during this period. A similar problem occurs during uplink, when only one RS at a time may transmit to the BS, while the other RS's are idle until it is their turn to transmit. To further compound the problem, each RS cannot listen or transmit to the BS when it is communicating with it's own SS's. A similar problem occurs in networks using frequency domain sharing, except that multiple frequencies are shared by the RS's instead of multiple time slots during any given period, and some of those frequencies are idle for much of the time during a given time period due to this highly structured allocation of the frequencies. All this idle time/ frequencies is a waste of potential communication resources within the network.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing, transmitting, and/or receiving information in a form readable by one or more computers. For example, a computer-readable medium may include a tangible storage medium, such as but not limited to read only memory (ROM); random access memory (RAM); magnetic disk storage media; optical storage media; a flash memory device, etc. A computer-readable medium may also include a propagated signal which has been modulated to encode the instructions, such as but not limited to electromagnetic, optical, or acoustical carrier wave signals.

The term "wireless" and its derivatives may be used herein to describe circuits, devices, systems, methods, techniques, communications channels, etc., that communicate data by using modulated electromagnetic radiation through a non-solid medium. The term does not imply that the associated devices do not contain any wires, although in some embodiments they might not.

In various embodiments of the invention, a relay station (RS) may communicate with a subscriber station (SS) at the same time that the associated base station (BS) is communicating with another RS in the same network. (Note: the phrase "at the same time", as used in this document, indicates that the relevant communications overlap in time, but does not necessarily indicate that the communications start and/or end at the same time.) This is different than the conventional technique of devoting one time period exclusively to communications between the BS and the RS's, and devoting another time period exclusively to communications between the RS's and the SS's. For convenience of description, the terms "base station", "relay station", and "subscriber station" are used extensively in this document, but the same inventive concepts are intended to encompass equivalent wireless network devices that are labeled with other terms. The term "base station" is used herein to describe a wireless network controller. The term "subscriber station" is used herein to describe an end-user wireless device that communicates with other subscriber stations indirectly by having such communications routed through the base station. The term "relay station" is used herein to describe a wireless device that receives and forwards messages between the base station and subscriber station. Other terms may be used to describe any of these devices, such as but not limited to access point (AP) for a base station, mobile station (MS) or STA for a subscriber station, etc. The terms used in this document are intended to encompass all such alternative labels for these devices.

Figure 1A:
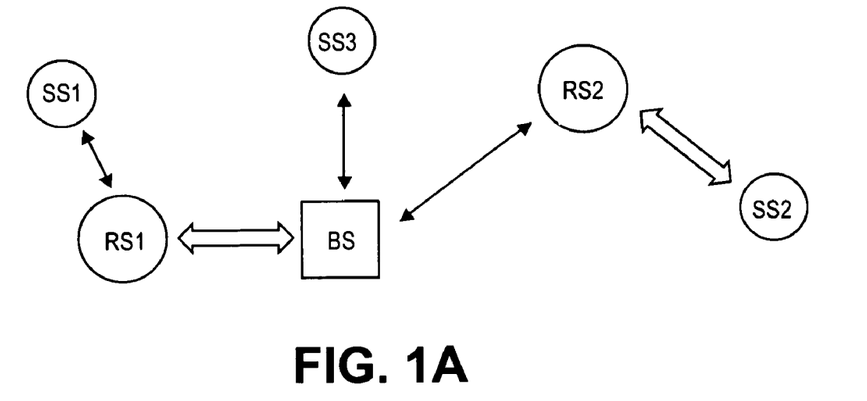
FIGS. 1A, 1B, 1C show a wireless communications network, according to an embodiment of the invention.
Figure 1B:
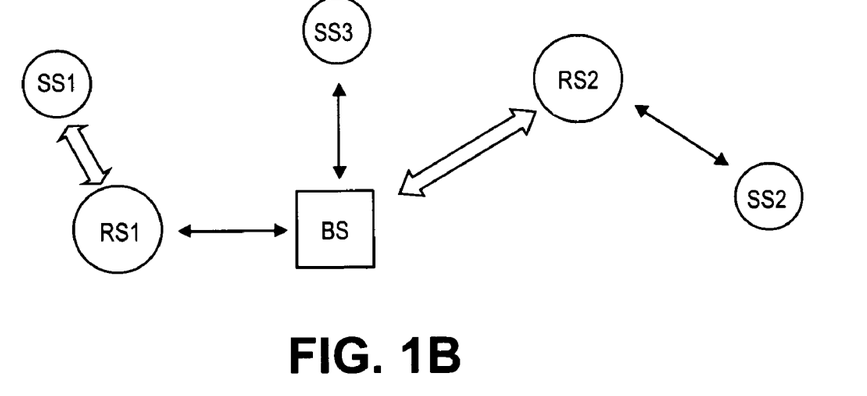
Figure 1C:
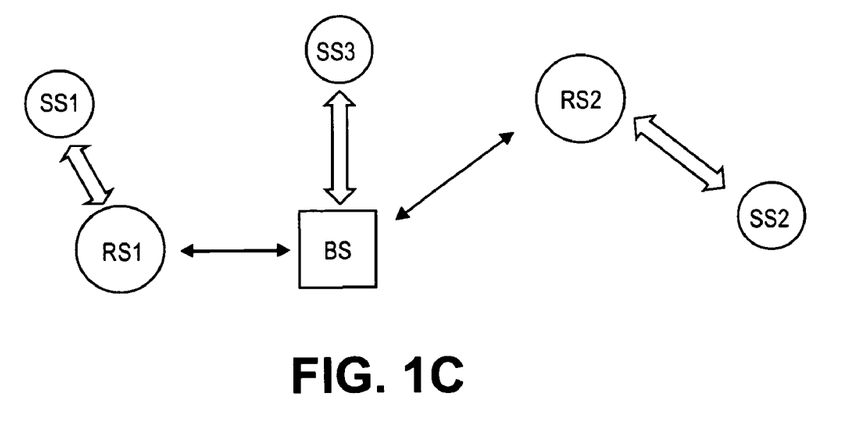

FIGS. 1A, 1B, 1C show a wireless communications network, according to an embodiment of the invention. The illustrated embodiment shows a base station BS, three subscriber stations SS1, SS2, SS3, and two relay stations RS1, RS2. Each of the devices shown in the network has one or more antennas to communicate wirelessly with other devices in the network. Each arrow, whether shown in single or double lines, indicates where a direct wireless communications link has been established between two devices. As indicated by the arrows, the BS communicates directly with SS3, but communicates indirectly with SS1 and SS2 by having those messages relayed through RS1 and RS2, respectively. It is assumed that each device may not transmit to one of these devices while receiving from another one of these devices. It is further assumed that the BS schedules blocks of time during which each RS may communicate with the BS, and further schedules blocks of time during which each RS may communicate with its associated SS's.

Within each of FIGS. 1A, 1B, and 1C, the double-line arrows mean that the indicated pairs of devices may communicate with each other at the same time, but the other links will remain silent during that time. So in FIG. 1A, RS2 may communicate with SS2 at the same time that the BS communicates with RS1, but no communication may take place in the other links at that time. In FIG. 1B, RS1 may communicate with SS1 at the same time that the BS communicates with RS2, but no communication may take place in the other links at that time. In FIG. 1C, RS1 may communicate with SS1, and RS2 may communicate with SS2, at the same time that the BS communicates with SS3, but no communication may take place in the other links at that time. These figures do not imply that all the indicated devices must communicate with each other at the same time, but rather that they may communicate with each other at the same time because no device will be required to transmit and receive at the same time for these scenarios to happen. These three scenarios cover all the possible communication links for the devices shown in these figures. However, the same concept may be extended to cover more RS's and/or more SS's in a network.

Conventional networks may maintain orderly communications within the network by assigning a block of time, labeled herein as a subframe, for downlink communications, and a separate subframe for uplink communications. Although the term 'subframe' is used in this description, the various embodiments of the invention are not limited to communications that use this label, and similar concepts that use other labels are also included. The downlink subframe may be divided into a first portion designated only for transmitting data from the BS to the RS's, and a second portion designated only for transmitting data from the RS's to the SS's. Similarly, the uplink subframe may be divided into a first portion designated only for transmitting from the SS's to the RS's, and a second portion designated only for transmitting from the RS's to the BS. Of course, each portion may be further divided into sub-portions for each RS or SS, so that they will not interfere with each other. While this orderly conventional schedule is simple to implement and may reduce the incidence of interference between the various devices in the network, it may also waste much of the potential bandwidth in the network by forcing most of the devices to refrain from communicating at all while they are waiting for their time slot. Various embodiments of the invention may use some of this idle bandwidth by permitting communications between an RS and its SS(s) during periods when the BS is communicating with one or more other RS's.

Figure 2:
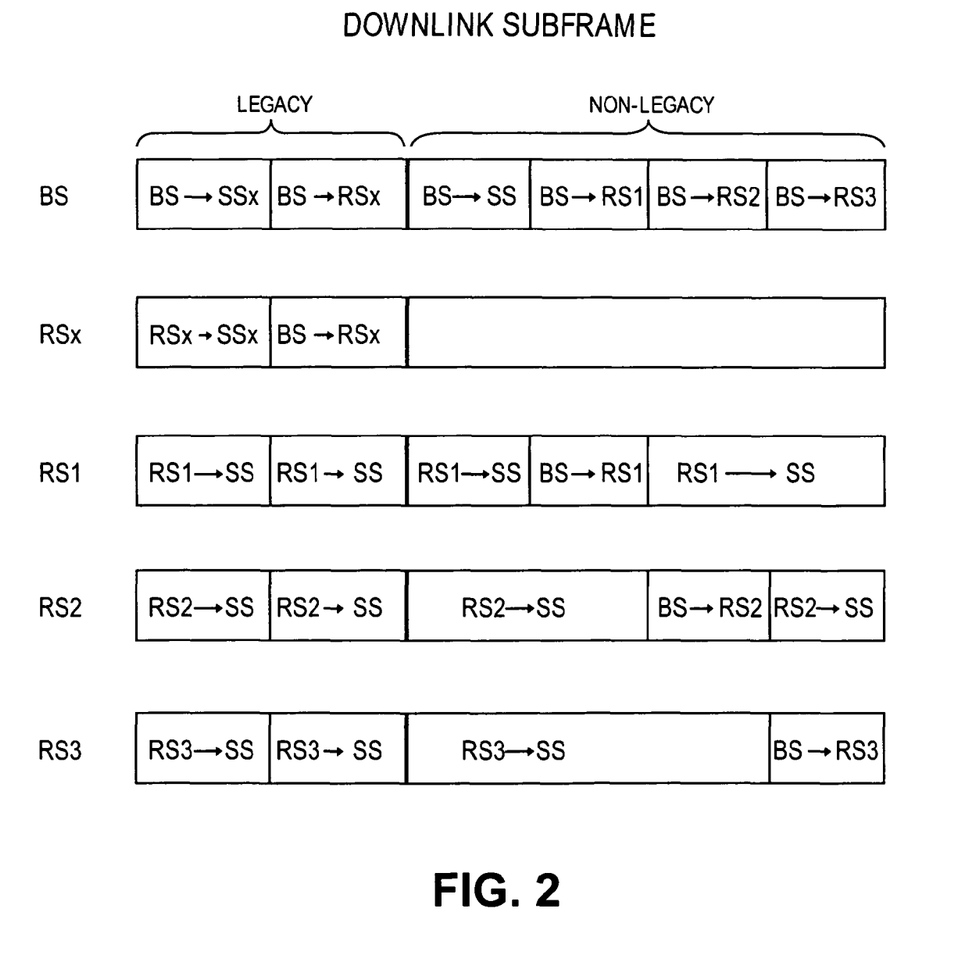
FIG. 2 shows a downlink subframe, according to an embodiment of the invention.

FIG. 2 shows a downlink subframe, according to an embodiment of the invention. This figure, as well as some of the subsequent figures, show which devices may communicate during an indicated time period. It does not show the detailed contents of those communications, such as but not limited to preambles, headers, payload, error correction codes, acknowledgements in the reverse direction, etc. Because a network implementing the various embodiments of the invention would likely have to also accommodate legacy devices that are unable to implement those embodiments (for example, because the legacy devices are compatible with an earlier standard but not the current standard), the illustrated subframe is divided into two time periods. The legacy period is a time when legacy RS's and legacy SS's, shown as RSx and SSx, resepectively, can communicate with each other and with the BS. The non-legacy period is a time when the non-legacy RS's and SS's (i.e., those that can implement the various embodiments of the invention, shown as RS1, RS2, RS3, and SS, respectively) may communicate with each other and with the BS. In this example, the legacy devices remain silent during the non-legacy period. Of course, the BS must be compatible with the non-legacy devices, and if necessary also be compatible with legacy devices. Only three specific non-legacy RS's are shown (RS1, RS2, RS3), but more may be implemented by following the same concepts described here. The single term SS is used to collectively encompass all the SS's that may communicate directly as shown with any of the BS, RS1, RS2, or RS3. Further time division and/or frequency division and/or spatial division techniques may be used within each indicated time period to accommodate multiple SS and multiple RS devices during the time periods indicated for those devices.

Five different views of the time period covered by the downlink subframe are shown, from the point of view of the different devices. The BS row shows communications as they may be experienced by the BS during this downlink subframe. The RSx row shows communications as they may be experienced by any of the legacy RSx's during the same downlink subframe. The RS1, RS2, and RS3 rows show communications as they may be experienced by those three specific non-legacy relay stations during the same downlink subframe.

As shown in the BS and RSx rows, during the first part of the legacy period the BS may transmit directly to selected legacy SSx's that do not use a relay to receive messages from the BS. In some embodiments, the legacy RSx's may transmit to their respective SSx's during that same time period. If any transmissions from the BS and from the legacy RSx's interfere with each other when received by an SSx (for example, because their respective SSx's are located near each other), the BS may need to schedule such transmissions during different parts of the period, or use different frequencies, to avoid such interference. During the second part of the legacy period, the BS may transmit to the legacy relay stations RSx. Although RS1, RS2, and RS3 are not legacy devices, in some embodiments they also may be permitted to transmit to their SS's during the legacy period, provided they do not interfere with the communications between the legacy devices. This is shown in the RS1, RS2, and RS3 rows. In other embodiments, RS1 RS2, and RS3 may be required to remain silent during the legacy period.

As shown in the BS row, during the non-legacy period the BS may schedule separate, non-overlapping time periods for transmitting to each of RS1, RS2, RS3. The BS may also schedule a time period to transmit to the various non-legacy SS's. In the RS1, 2, and 3 rows, each RS is shown receiving its transmission during its scheduled time period. (Note: when using Spatial Division Multiple Access (SDMA) techniques, a BS may actually be able to transmit to multiple RS's or SS's at the same time on the same frequency, using directional transmissions. That situation is not described here, but could be handled in a similar manner, with each time period being devoted to a group of devices rather than a single device.) But unlike conventional network operations, each RS may also be able to transmit to its associated SS's during some or all of the remainder of the non-legacy period, even though the BS may be transmitting to one of the other RS's at the same time. The example shown in the BS row dedicates separate time periods exclusively to each of the RS's. However, in some communication techniques using multiple sub-channels, such as orthogonal frequency division multiple access (OFDMA), the BS may use some of the sub-channels for transmitting to the SS's at the same time that it uses other sub-channels for transmitting to the RS's.

Figure 3:
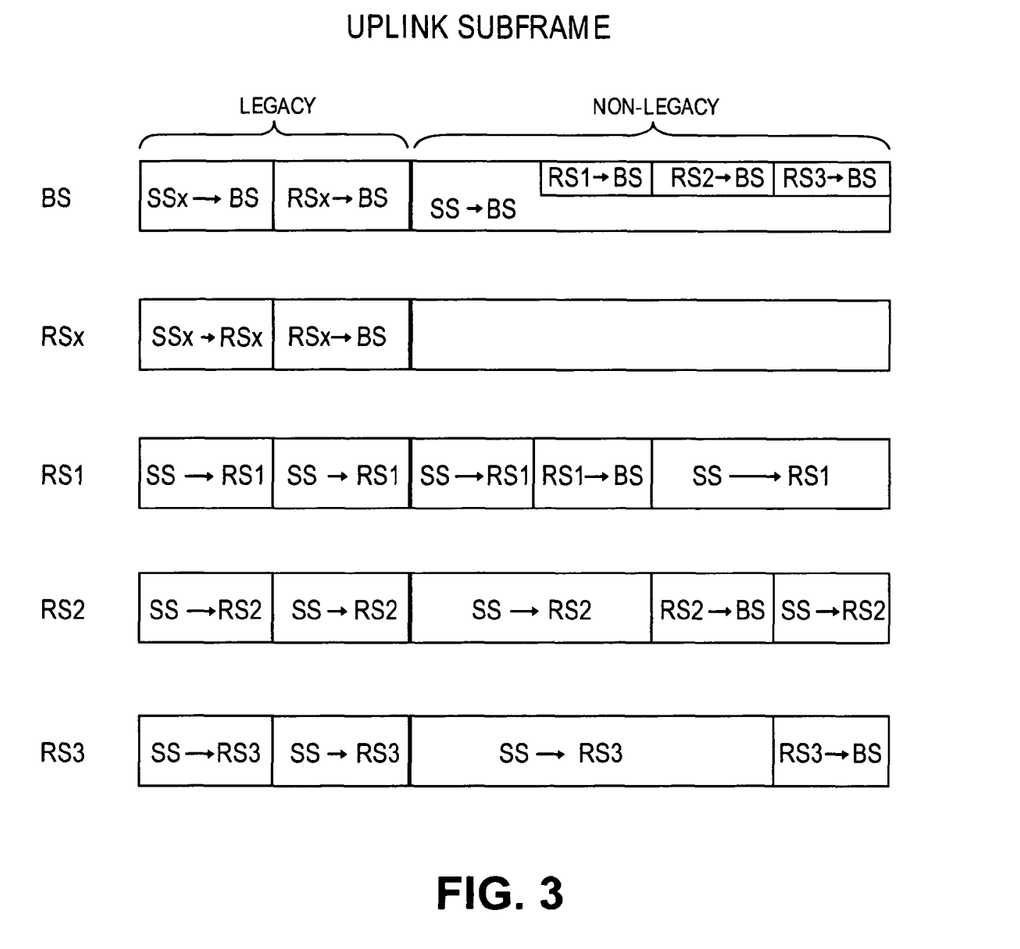
FIG. 3 shows an uplink subframe, according to an embodiment of the invention.

FIG. 3 shows an uplink subframe, according to an embodiment of the invention. Similar to the operations described before (but in the opposite direction), the legacy SSx's may use the first portion of the legacy period to transmit to the BS or to their respective RSx's, and the legacy RSx's may use the second part of the legacy time period to transmit to the BS. Also similar to before, in some embodiments the non-legacy SS's may use the legacy time period to transmit to the non-legacy RS's, providing this does not cause undue interference in the network. In other embodiments, the non-legacy SS's must remain silent during the legacy period.

During the non-legacy period, the non-legacy SS's that are directly linked to the BS may transmit to the BS, while RS1, RS2, and RS3 may transmit to the BS during separate time periods. Similar to the operations described for the downlink, if OFDMA or another multi-frequency technique is used, in some embodiments the SS's may continue to transmit to the BS during the same periods that the RS's are transmitting to the BS, but using different sub-channels than the RS's. This is shown in the BS row, in which the vertical dimension of the row is used to indicate different sub-channels, a technique for illustrating time vs. sub-channels that is common with OFDMA communications charts. The RS1, RS2, and RS3 rows show each legacy RS transmitting to the BS during a different period. Unlike conventional networks, these rows also show each RS having at least some of the remainder of the legacy period available to it for receiving transmissions from its respective SS's, even though other RS's may be transmitting to the BS at the same time.

Figure 4:
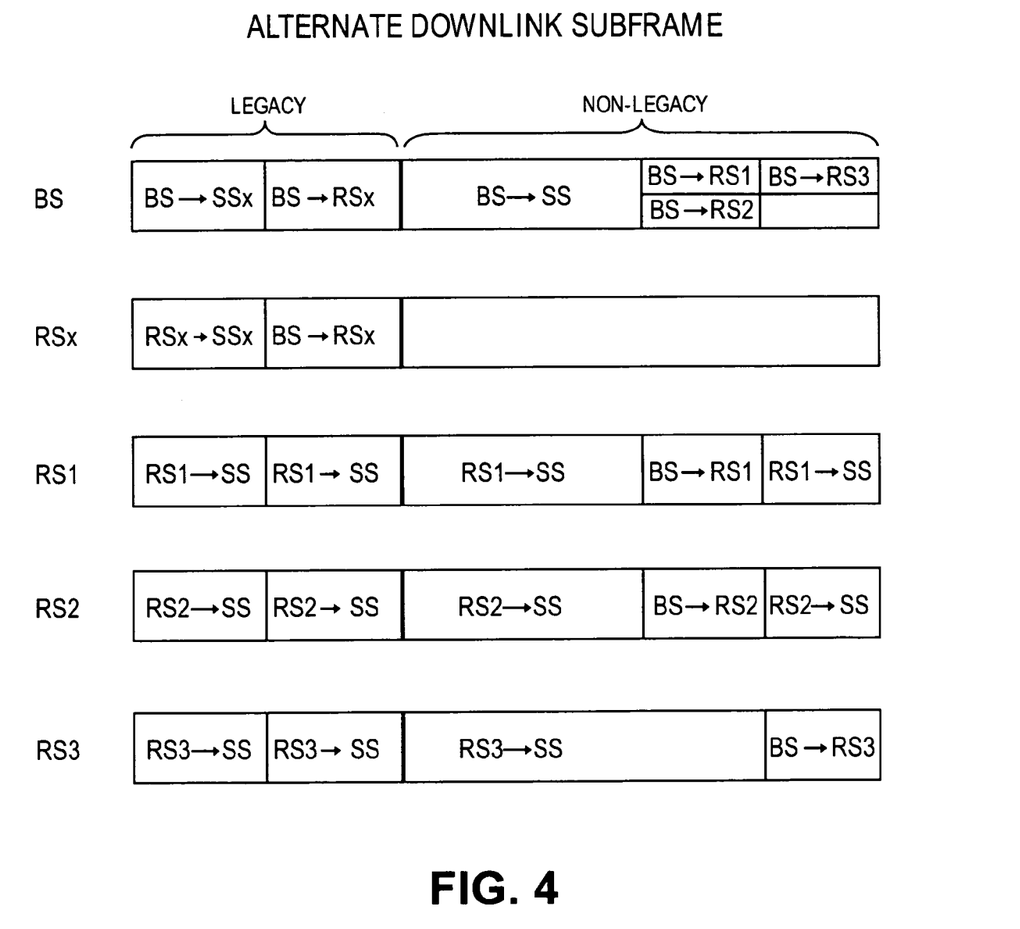
FIG. 4 shows an alternate downlink subframe, according to an embodiment of the invention.

FIG. 4 shows an alternate downlink subframe, according to an embodiment of the invention. The downlink subframe of FIG. 4 is similar to the downlink subframe of FIG. 2, with one important exception—the BS may transmit to more than one RS at the same time, using multi-frequency techniques such as, but not limited to, OFDMA. In the illustrated example, the BS is able to transmit to RS1 using some of the sub-channels, and transmit to RS2 at the same time using others of the sub-channels. The BS is shown transmitting to RS3 in a different time period than RS1 and RS2. Of course, other combinations of time periods, sub-channels, and RS's may also be used, to achieve the goal of transmitting to more than one RS at the same time. For example, the BS may be transmitting to more than two RS's at the same time, and/or the time periods for different RS's may overlap partially but not completely. As seen in the RS1, RS2, and RS3 rows, each RS may receive its portion of the transmission from the BS in the allocated time period, and may use some or all of the remainder of the legacy period to transmit to its SS's.

Although not shown, this same principle may also be used in an alternate uplink subframe, in which more than one RS may transmit to the BS at the same time, using different sub-channels. As illustrated in FIG. 3, each RS may use some or all of the remaining non-legacy period to receive transmissions from its SS's.

Although FIGS. 2, 3, and 4 show a particular temporal order of communications between BS-SS, BS-RS, RS-SS, BS-SSx, BS-RSx, and RSx-SSx, in both the uplink and downlink subframes, this is for example only. Other embodiments may use a different order for some or all of these things without departing from the described inventive concept. Further, some embodiments may not have a provision for legacy devices, thus eliminating the BS-SSx, BS-RSx, and RSx-SSx communications time periods.

Figure 5:
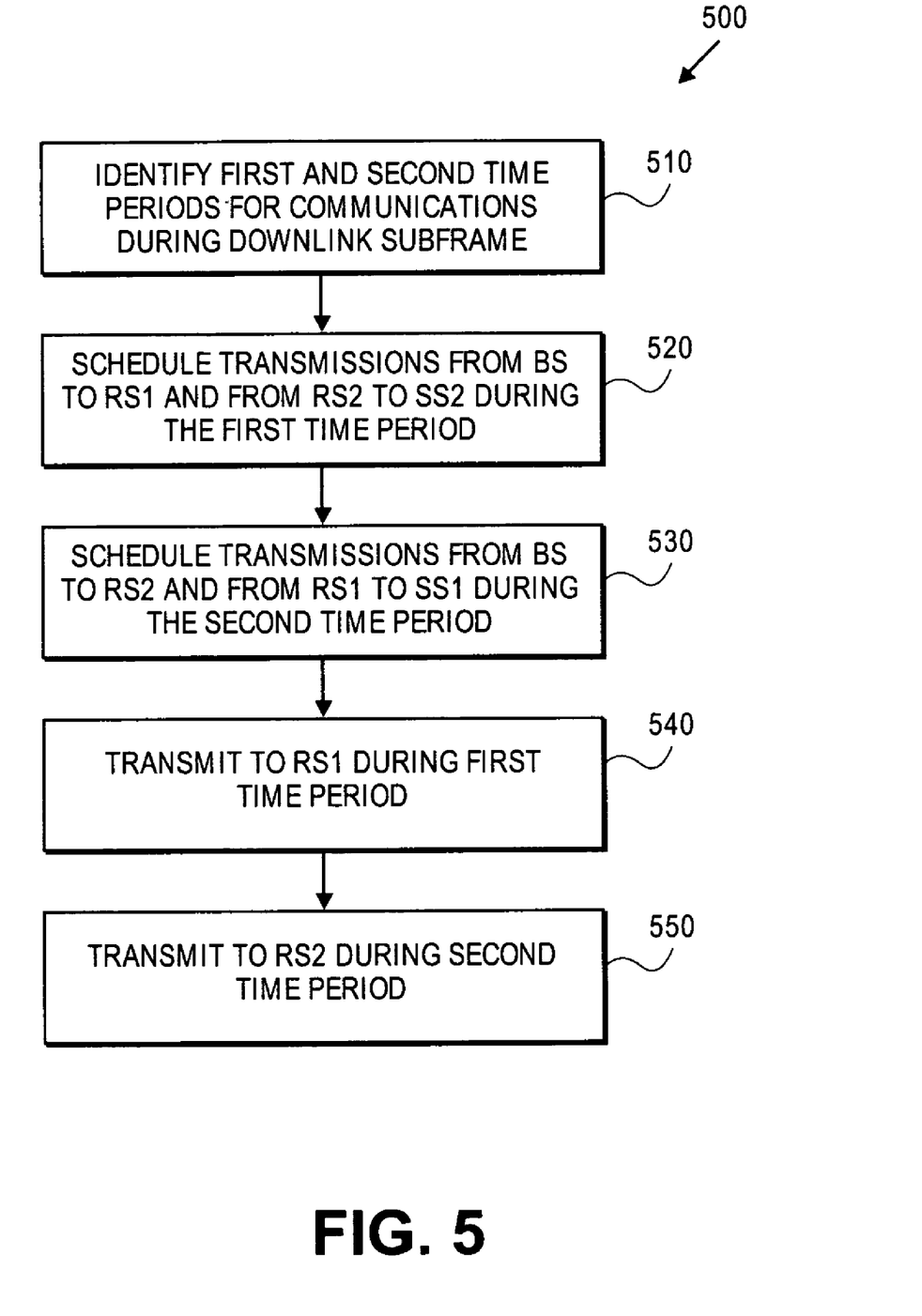
FIG. 5 shows a flow diagram of a method of communicating performed by a base station during a downlink subframe, according to an embodiment of the invention.

FIG. 5 shows a flow diagram of a method of communicating performed by a base station during a downlink subframe, according to an embodiment of the invention. In flow diagram 500, at 510 the base station BS may identify two time periods for scheduling network communications with two relay stations during the downlink subframe. (Note: this and other examples may only show two time periods to handle two relay stations, but this principle may easily be extended to additional time periods to handle additional relay stations). The two time periods may be non-overlapping in time. At 520, the BS may schedule one of the relay stations RS1 that is associated with the base station to receive a transmission from the BS during the first time period. Note: scheduling an event, as used herein, includes transmitting the schedule to the affected device(s). The BS may also schedule a second relay station RS2 to transmit to at least one subscriber station SS2 that is associated with RS2, during the same first time period. The transmission from the BS to RS1 and the transmission from RS2 to SS2 may be scheduled to overlap in time, as none of these devices will be required to both transmit and receive at the same time under this scenario.

At 530, the BS may schedule RS2 to receive a transmission from the BS during the second time period. The BS may also schedule RS1 to transmit to at least one subscriber station (e.g., SS1) that is associated with RS1, during the same second time period. In some embodiments, the BS may simply make the second time period available to RS1 for communicating with its associated SS's, and RS1 may make the decision whether to actually schedule such communications. The transmission from the BS to RS2 and the transmission from RS1 to SS1 may be scheduled to overlap in time, as none of these devices will be required to both transmit and receive at the same time under this scenario. At 540 the BS may make its scheduled transmission to RS1 during the first time period, and at 550 the BS may make its scheduled transmission to RS2 during the second time period. The scheduled transmissions from RS2 to SS2 and from RS1 to SS1 may also take place during the first and second time periods, respectively, but are not shown here since they are not performed by the BS.

Figure 6:
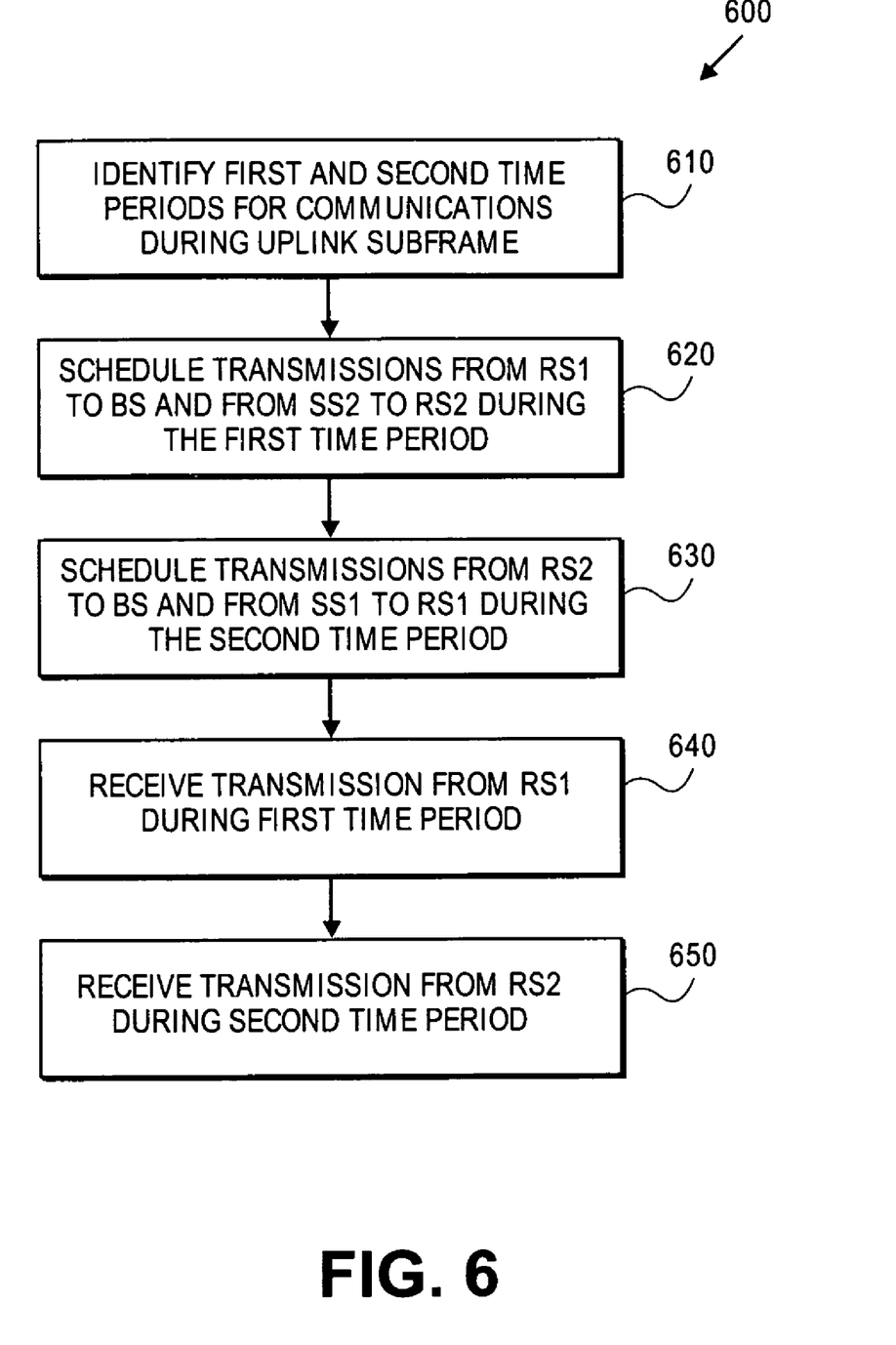
FIG. 6 shows a flow diagram of a method of communicating performed by a base station during an uplink subframe, according to an embodiment of the invention.

FIG. 6 shows a flow diagram of a method of communicating performed by a base station during an uplink subframe, according to an embodiment of the invention. In flow diagram 600, at 610 the base station BS may identify two time periods for scheduling network communications during the uplink subframe. The two time periods may be non-overlapping in time. At 620, the BS may schedule one of the relay stations RS1 that is associated with the base station to make a transmission to the BS during the first time period. The BS may also schedule a second relay station RS2 to receive a transmission from at least one subscriber station (e.g., SS2) that is associated with RS2, during the same first time period. In some embodiments, the BS may simply make this time period available to RS2 to receive transmissions from its SS's, and RS2 may actually schedule these communications during this time period. The transmission from RS1 to the BS and the transmission from SS2 to RS2 may be scheduled to overlap in time, as none of these devices will be required to both transmit and receive at the same time under this scenario.

At 630, the BS may schedule RS2 to make a transmission to the BS during the second time period. The BS may also schedule RS1 to receive a transmission from at least one subscriber station SS1 that is associated with RS1, during the same second time period. The transmission from RS2 to the BS and the transmission from SS1 to RS1 may be scheduled to overlap in time, as none of these devices will be required to both transmit and receive at the same time under this scenario. At 640 the BS may receive its scheduled transmission from RS1 during the first time period, and at 650 the BS may receive its scheduled transmission from RS2 during the second time period. The scheduled transmissions from SS2 to RS2 and from SS1 to RS1 may also take place during the first and second time periods, respectively, but are not shown here since they are not performed by the BS.

Figure 7:
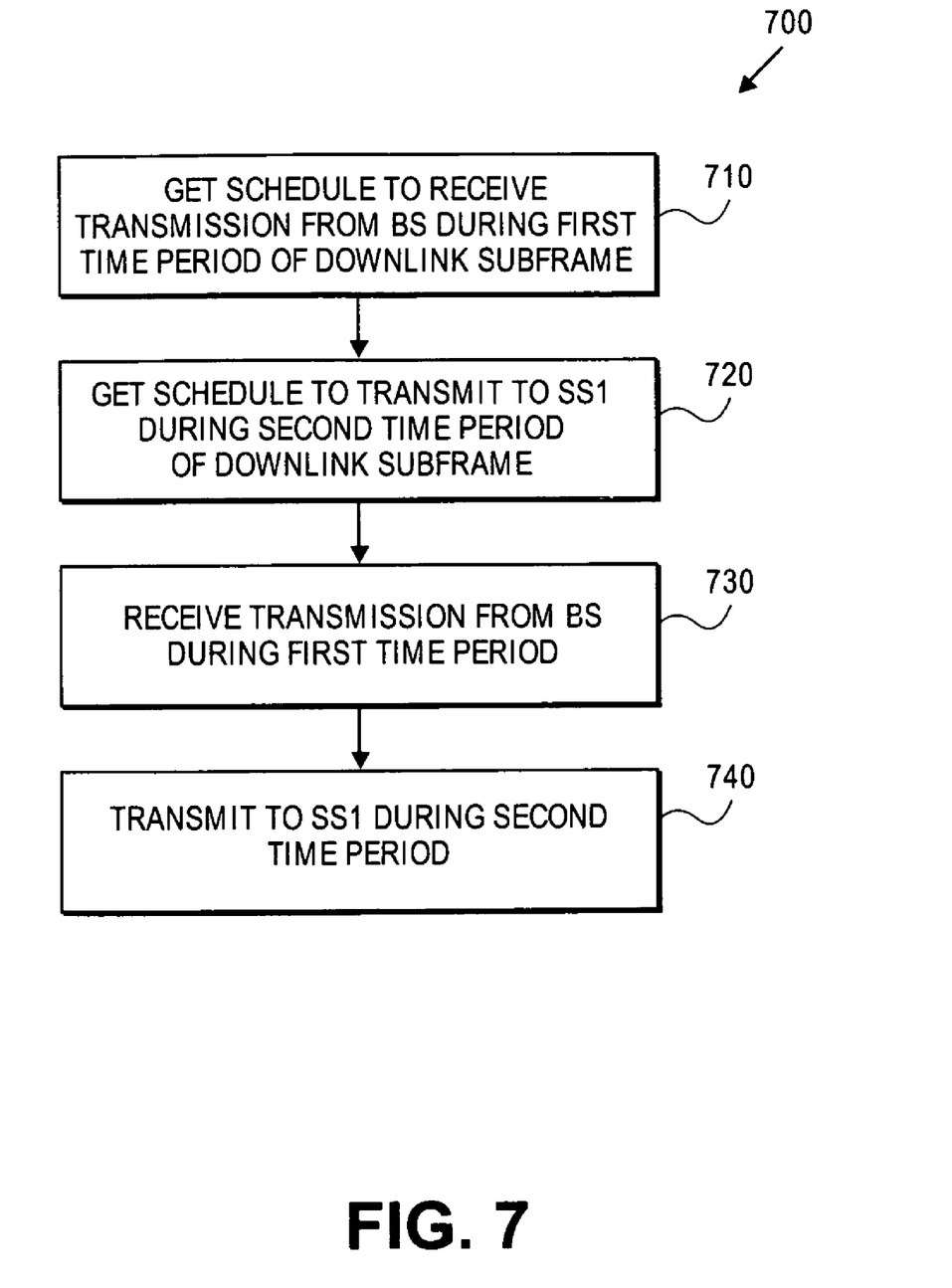
FIG. 7 shows a flow diagram of a method of communicating performed by a relay station during a downlink subframe, according to an embodiment of the invention.

FIG. 7 shows a flow diagram of a method of communicating performed by a relay station during a downlink subframe, according to an embodiment of the invention. Referring back to previous reference designators, for purposes of this description the method may be assumed to be performed by relay station RS1. In flow diagram 700, at 710 RS1 may receive information from the BS that RS1 is scheduled to receive a transmission from the BS during a first time period in a downlink subframe. At 720 RS1 may also receive information from the BS that RS1 may transmit to one or more of its associated subscriber stations (e.g., SS1) during a second time period that is also in the downlink subframe. (Alternately, the BS may actually schedule these RS-to-SS transmissions in the second time period.) The first and second time periods may not overlap in time. Subsequently, at 730 RS1 may receive its scheduled transmission from the BS during the first time period, and at 740 may make its scheduled transmission to SS1 during the second time period. Other transmissions from the RS2 to SS2, from the BS to RS2, may also take place during the first and second time periods, respectively, but are not shown because they are not performed by RS1.

Figure 8:
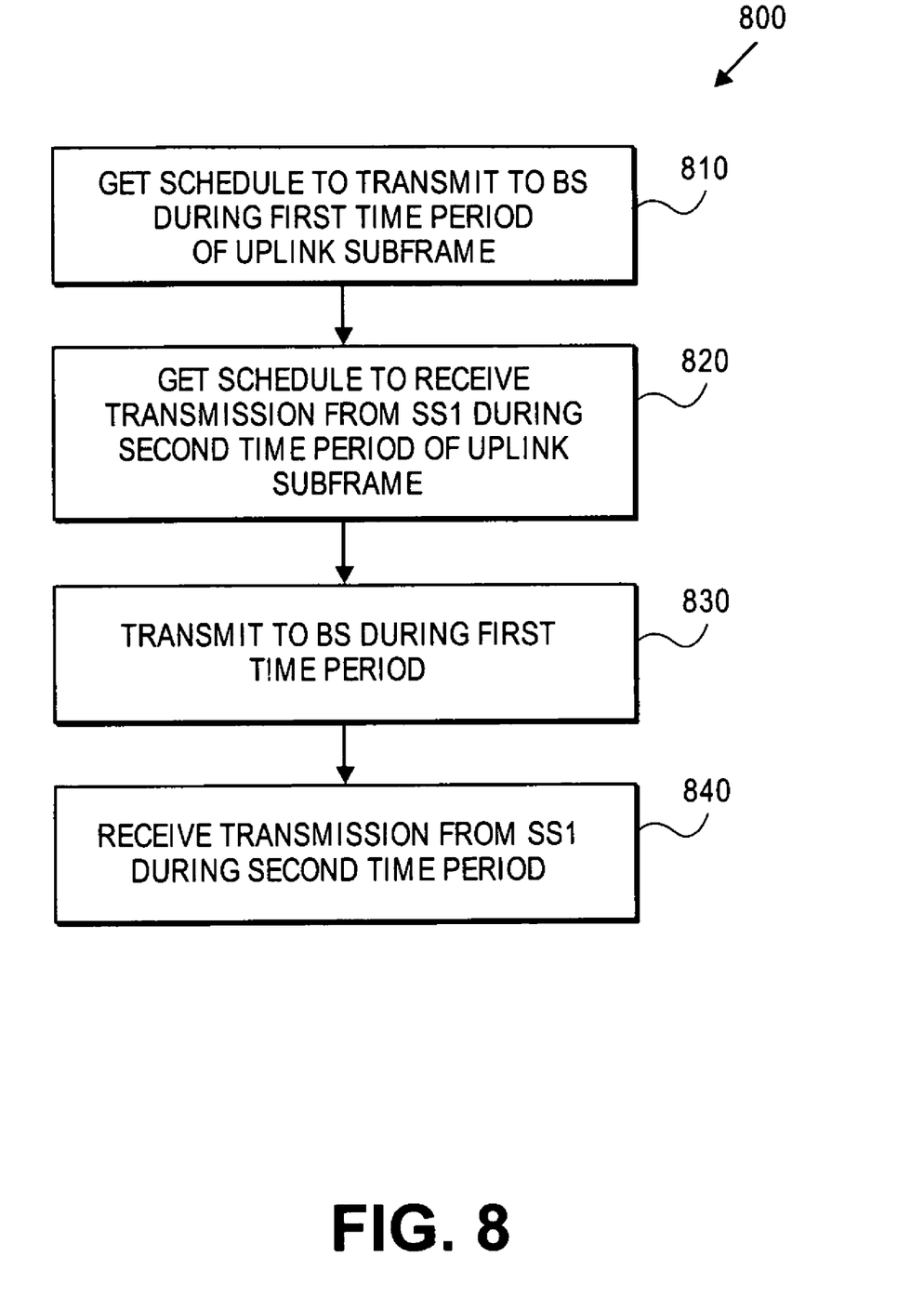
FIG. 8 shows a flow diagram of a method of communicating performed by a relay station during an uplink subframe, according to an embodiment of the invention.

FIG. 8 shows a flow diagram of a method of communicating performed by a relay station during an uplink subframe, according to an embodiment of the invention. Referring back to previous reference designators, for purposes of this description the method may be assumed to be performed by relay station RS1. In flow diagram 800, at 810 RS1 may receive information from the BS that RS1 is scheduled to transmit to the BS during a first time period that is in the uplink subframe. At 820 RS1 may receive information from the BS that RS1 is allowed to receive a transmission from one or more subscriber stations (e.g., SS1) during a second time period in an uplink subframe. The first and second time periods may not overlap in time. Subsequently, at 830 RS1 may make its scheduled transmission to the BS during the first time period, and at 840 may receive its scheduled transmission from SS1 during the second time period. Other transmissions from RS2 to the BS, and from a subscriber station SS2 to RS2, may also take place during the first and second time periods, respectively, but are not shown because they are not performed by RS1.

The previous descriptions in this document have generally assumed that communications between an RS and its associated SS's are scheduled by the BS. However, in some embodiments, the BS may just notify the RS that the RS is allowed to communicate with its SS's during a certain period if it desires to do so, without the BS explicitly scheduling those communications. In still other embodiments, the RS may determine for itself that it may communicate with its SS's during a certain period based on receiving the schedule that defines when the BS will communicate with other RS's.

The previous descriptions in this document have been based on communications that use time division techniques, i.e., techniques that schedule communications between different devices on the same frequency(s) but at different times (e.g., communications between the BS and different RS's are scheduled to occur at different times), so that a communication between two specific devices will not interfere with a communication between two other devices, even if all those devices are using the same frequency. The foregoing embodiments avoid this interference issue through spatial reuse, in which two or more such pairs of devices may communicate at the same time, provided that spatial reuse (spatial separation or directional communications) keep the communications between one pair of devices from interfering with the communications between another pair of devices in the same network.

These same general principles of spatial reuse may be applied to communications that use frequency division techniques, in which communications between different devices are scheduled to occur at the same time but at different frequencies, so that a communication between two specific devices will not interfere with a communication between two other devices, even though they occur at the same time. Applying spatial reuse to frequency division, two or more pairs of devices may communicate on the same frequency at the same time, provided that spatial reuse keeps the communications between one pair of devices from interfering with the communications between another pair of devices in the same network. In the time division example, devices that would normally communicate at different times are scheduled to communicate at the same time, while in the frequency division example, devices that would normally communicate on different frequencies are scheduled to communicate on the same frequency. In both cases, spatial reuse permits different pairs of devices to communicate at the same time on the same frequency(s), because physical separation or directional communications permits them to do so without interfering with each other. The various embodiments described herein take advantage of this approach by having a BS communicate with a first RS, while another RS communicates with its SS's at the same time and on the same frequency(s).

Figure 9:
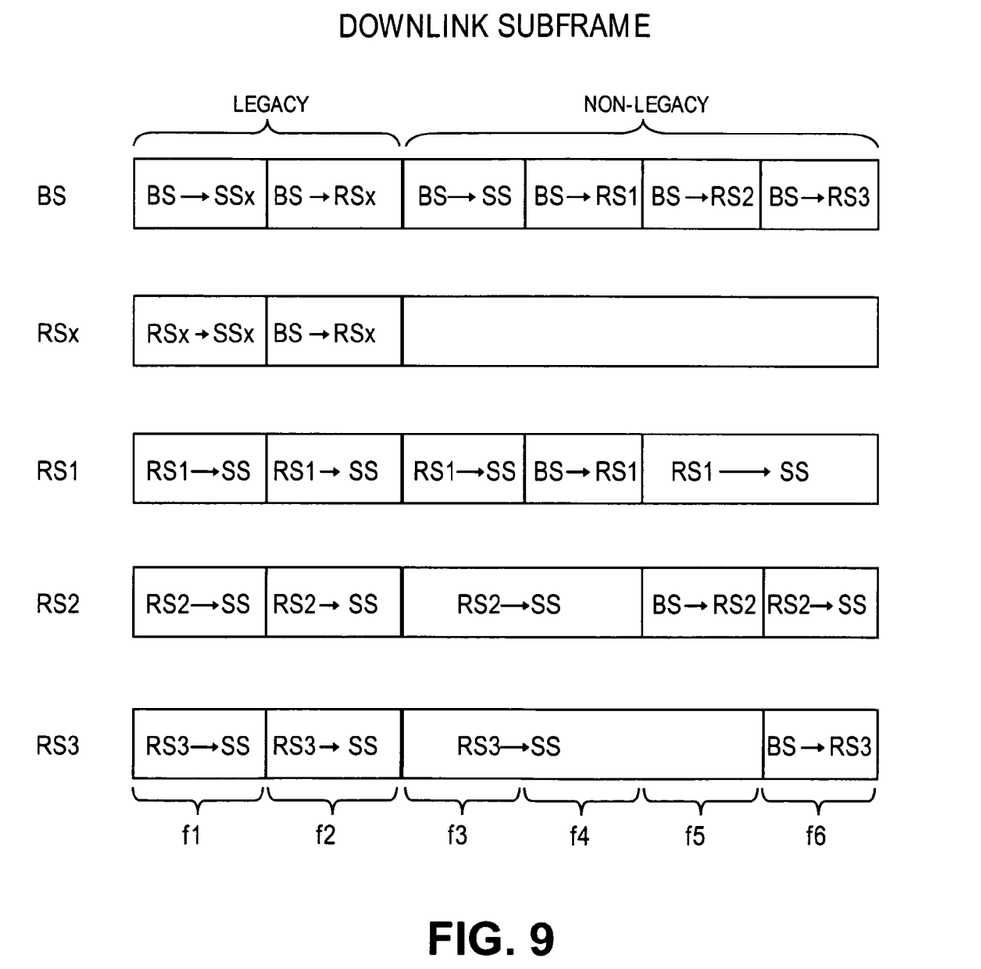
FIG. 9 shows a downlink subframe for a network using FDD, according to an embodiment of the invention.

FIG. 9 shows a downlink subframe for a network using frequency division techniques, according to an embodiment of the invention. This figure is similar to that of FIG. 2, except that the horizontal axis is an indication of frequencies instead of time. Each of f1-f6 may represent a single frequency, or a group of frequencies (such as a group of sub-channels used in OFDMA) that transmit different parts of the indicated communication. In this example, f1 and f2 are devoted to the legacy devices, while the base station uses f3 to transmit from BS to SS, f4 to transmit from the BS to RS1, f5 to transmit from the BS to RS2, and f6 to transmit from the BS to RS3. As indicated, some of these frequencies may also be used for communications between an RS and its SS's at the same time another RS is using the same frequencies to communicate with the BS. Some or all of these communications, at the indicated frequencies, may take place at the same time. Although only a downlink subframe is shown, the same concepts may easily be applied to an uplink subframe.

Because of the similarities between the way embodiments of the invention are handled in time division networks and the way they are handled in frequency division networks, the inventive concepts may be expressed with a common term that includes both. The term "time/frequency resource" is used herein to mean a particular period of time and a particular set of one or more frequencies. By definition, if two devices use the same time/frequency resource, their communications overlap in time and use at least some of the same frequencies (it is the overlapping time and the same frequencies that constitute the 'same' time/frequency resource). Conversely, different time/frequency resources (e.g., first and second time/frequency resources) either do not overlap in time or do not use any of the same frequencies at the same time.

Figure 10:
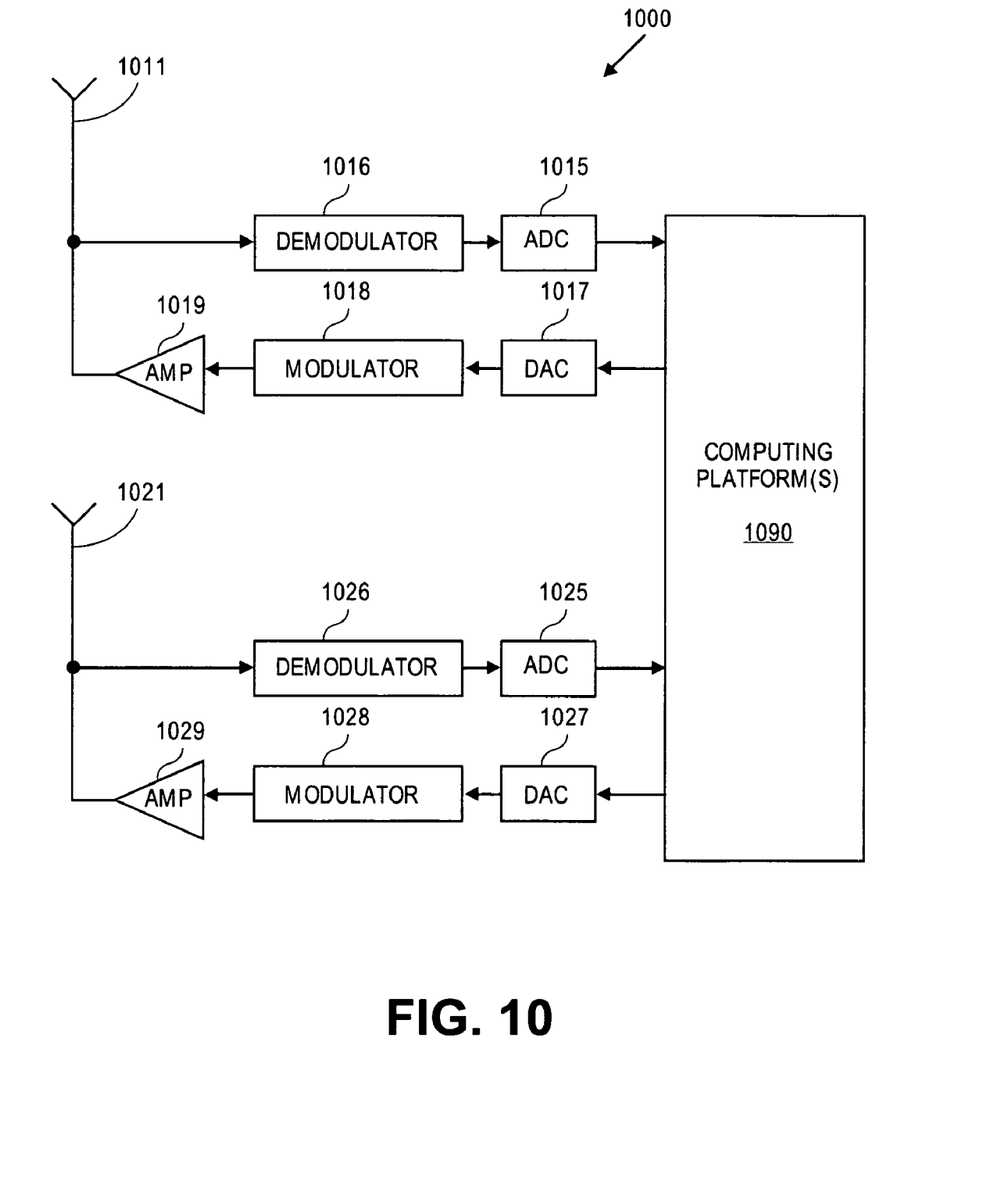
FIG. 10 shows a diagram of a wireless communications device, according to an embodiment of the invention.

FIG. 10 shows a diagram of a wireless communications device, according to an embodiment of the invention. Any of the aforementioned devices BS, RS1, RS2, SS1, and SS2 may contain some or all of the components shown in illustrated device 1000. For example, one or more computing platforms 1090 may be used to control overall operations of the device 1000. This particular embodiment shows two antennas 1011 and 1021, but other embodiments may contain one, three, or more antennas, each with necessary supporting components. In this example, antenna 1011 is coupled to a demodulator 1016 to demodulate the received signal and convert it to a baseband signal. The baseband signal may then be converted to digital format with analog-to-digital converter (ADC) 1015. For transmissions, the digital signals may be converted to analog with digital-to-analog converter (DAC) 1017. The analog signals may then be modulated onto a radio frequency (FR) carrier wave through modulator 1018, and then amplified in power amp 1019 for transmission through antenna 1011.

Similar functionality may be provided for antenna 1021 by demodulator 1026, ADC 1025, DAC 1027, modulator 1028, and amplifier 1029. FIG. 10 shows one embodiment of a configuration of a wireless communications device, but other embodiments may use different components, and/or may arrange components in a different manner than shown.

The foregoing description is intended to be illustrative and not limiting. Variations will occur to those of skill in the art. Those variations are intended to be included in the various embodiments of the invention, which are limited only by the scope of the following claims.

What is claimed is:

1. An apparatus, comprising
a first relay station to relay wireless communications between a base station and a first subscriber station, the first relay station having a computing platform, a modulator, and a demodulator, the first relay station to:
communicate with the base station using a first time/frequency resource;
and
communicate with the first subscriber station using a second time/frequency resource;
wherein a second relay station is scheduled to communicate with a second subscriber station using the first time/frequency resource and the second relay station is scheduled to communicate with the base station using the second time/frequency resource;
wherein the first and second time/frequency resources are both periods of time or are both one or more frequencies.

2. The apparatus of claim 1, wherein the first time/frequency resource is a first period of time and the second time/frequency resource is a second period of time that does not overlap with the first period of time.

3. The apparatus of claim 1, wherein the first time/frequency resource comprises a first frequency and the second time/frequency resource comprises a second frequency that does not overlap the first frequency.

4. The apparatus of claim 1, wherein:
the first and second time/frequency resources are to be used during a downlink communication;
said communicating with the base station using the first time/frequency resource comprises receiving from the base station;
said communicating with the first subscriber station comprises transmitting to the first subscriber station;
said communicating with the second subscriber station comprises transmitting to the second subscriber station; and
said communicating with the base station using the second time/frequency resource comprises receiving from the base station.

5. The apparatus of claim 1, wherein:
the first and second time/frequency resources are to be used during an uplink communication;
said communicating with the base station using the first time/frequency resource comprises transmitting to the base station;
said communicating with the first subscriber station comprises receiving from the first subscriber station;
said communicating with the second subscriber station comprises receiving from the second subscriber station; and
said communicating with the base station using the second time/frequency resource comprises transmitting to the base station.

6. The apparatus of claim 1, wherein the first relay station comprises at least one antenna coupled to the modulator and the demodulator.

7. A method, comprising:
communicating with a first subscriber station using a first time/frequency resource that is also used by a relay station to communicate with a base station; and
communicating with the base station using a second time/frequency resource that is also used by the relay station to communicates with a second subscriber station;
wherein communications by the relay station, the first subscriber station, and the second subscriber station are scheduled by the base station; and
wherein the first and second time/frequency resources are both periods of time or are both one or more frequencies.

8. The method of claim 7, wherein:
the first and second time/frequency resources are used during a downlink communication;
said communicating with the first subscriber station comprises transmitting to the first subscriber station;
said communicating with the base station using the second time/frequency resource comprises receiving from the base station;
said communicating with the base station by the relay station comprises receiving from the base station; and
said communicating with the second subscriber station by the relay station comprises transmitting to the second subscriber station.

9. The method of claim 7, wherein:
the first and second time/frequency resources are used during an uplink communication;
said communicating with the first subscriber station comprises receiving from the first subscriber station;
said communicating with the base station using the second time/frequency resource comprises transmitting to the base station using the second time/frequency resource;
said communicating with the base station by the relay station comprises transmitting to the base station from the relay station; and
said communicating with the second subscriber station by the relay station comprises receiving from the second subscriber station by the relay station.

10. The method of claim 7, wherein the first time/frequency resource is a first time period and second time/frequency resource is a second time period that does not overlap with the first time period.

11. The method of claim 7, wherein the first time/frequency resource comprises a first frequency and the second time/frequency resource comprises a second frequency that does not overlap with the first frequency.

12. An article comprising
a non-transitory computer-readable medium that contains instructions, which when executed by one or more processors result in performing operations comprising:
communicating with a first subscriber station using a first time/frequency resource that is also used by a relay station to communicate with a base station; and
communicating with the base station using a second time/frequency resource that is also used by the relay station to communicate with a second subscriber station;
wherein said communicating takes place on a schedule received from the base station; and
wherein the first and second time/frequency resources are both periods of time or are both one or more frequencies.

13. The article of claim 12, wherein:
the first and second time/frequency resources are used during a downlink communication;
the operation of communicating with the first subscriber station comprises transmitting to the first subscriber station;
the operation of communicating with the base station using the second time/frequency resource comprises receiving from the base station using the second time/frequency resource;
said scheduled communication between the relay station and the base station comprises a transmission from the base station to relay station; and
said scheduled communication between the relay station and the second subscriber station comprises a transmission from the relay station to the second subscriber station.

14. The article of claim 12, wherein:
the first and second time/frequency resources are used during an uplink communication;
the operation of communicating with the first subscriber station comprises receiving from the first subscriber station;
the operation of communicating with the base station using the second time/frequency resource comprises transmitting to the base station using the second time/frequency resource;
said scheduled communication between the relay station and the base station comprises a transmission from the relay station to the base station; and
said scheduled communication between the relay station and the second subscriber station comprises a transmission from the second subscriber station to the relay station.

15. The article of claim 12, wherein the first time/frequency resource is a first time period, and the second time/frequency resource is a second time period that does not overlap with the first time period.

16. The article of claim 12, wherein the first time/frequency resource comprises a first frequency, and the second time/frequency resource comprises a second frequency that does not overlap with the first frequency.

17. An apparatus, comprising
a base station to schedule communications in a wireless network comprising the base station, first and second relay stations, and first and second subscriber stations, the base station having a processing platform, a modulator, and a demodulator, the base station to:
schedule communications between the base station and the first relay station using a first time/frequency resource;
schedule communications between the base station and the second relay station using a second time/frequency resource;
schedule communications between the first relay station and the first subscriber station using the second time/frequency resource; and
schedule communications between the second relay station and the second subscriber station using the first time/frequency resource;
wherein the first and second time/frequency resources are both time periods or are both one or more frequencies.

18. The apparatus of claim 17, wherein the first time/frequency resource is a first time period and the second time/frequency resource is a second time period that does not overlap with the first time period.

19. The apparatus of claim 17, wherein the first time/frequency resource comprises a first frequency and the second time/frequency resource comprises a second frequency that does not overlap with the first frequency.

20. The apparatus of claim 17, wherein:
the first and second time/frequency resources are used during a downlink communication;
said scheduling communications between the base station and the first relay station comprises scheduling a transmission from the base station to the first relay station;
said scheduling communications between the base station and the second relay station comprises scheduling a transmission from the base station to the second relay station;
said scheduling the communications between the first relay station and the first subscriber station comprises scheduling a transmission from the first relay station to the first subscriber station; and
said scheduling the communications between the second relay station and the second subscriber station comprises scheduling a transmission from the second relay station to the second subscriber station.

21. The apparatus of claim 17, wherein:
the first and second time/frequency resources are used during an uplink communication;
said scheduling communications between the base station and the first relay station comprises scheduling a transmission from the first relay station to the base station;

said scheduling communications between the base station and the second relay station comprises scheduling a transmission from the second relay station to the base station;

said scheduling the communications between the first relay station and the first subscriber station comprises scheduling a transmission from the first subscriber station to the first relay station; and said scheduling the communications between the second relay station and the second subscriber station comprises scheduling a transmission from the second subscriber station to the second relay station.

22. The apparatus of claim 17, wherein the base station comprises at least one antenna coupled to the modulator and the demodulator.

23. A method, comprising performing by a single communications device:

scheduling communications between a first relay station and a first subscriber station using a first time/frequency resource;

scheduling communications between a second relay station and a second subscriber station using a second time/frequency resource;

communicating with the second relay station using the first time/frequency resource; and communicating with the first relay station using the second time/frequency resource;

wherein the first and second time/frequency resources are both time periods or are both one or more frequencies.

24. The method of claim 23, wherein:

the first time/frequency resource is a first time period; and the second time/frequency resource is a second time period that does not overlap with the first time period.

25. The method of claim 23, wherein:

the first time/frequency resource comprises a first frequency; and the second time/frequency resource comprise a second frequency that does not overlap with the first frequency.

26. The method of claim 23, wherein:

the first and second time/frequency resources are used during a downlink communication;

said communicating with the first relay station comprises transmitting to the first relay station;

said communicating with the second relay station comprises transmitting to the second relay station;

said scheduling the communications between the first relay station and the first subscriber station comprises scheduling a transmission from the first relay station to the first subscriber station; and said scheduling the communications between the second relay station and the second subscriber station comprises scheduling a transmission from the second relay station to the second subscriber station.

27. The method of claim 23, wherein:

the first and second time/frequency resources are used during an uplink communication;

said communicating with the first relay station comprises receiving from the first relay station;

said communicating with the second relay station comprises receiving from the second relay station;

said scheduling the communications between the first relay station and the first subscriber station comprises scheduling a transmission from the first subscriber station to the first relay station; and said scheduling the communications between the second relay station and the second subscriber station comprises scheduling a transmission from the second subscriber station to the second relay station.

28. An article comprising a non-transitory computer-readable medium that contains instructions, which when executed by one or more processors result in performing operations comprising:

scheduling communications between a first relay station and a first subscriber station using a first time/frequency resource;

scheduling communications between a second relay station and a second subscriber station using a second time/frequency resource;

communicating with the first relay station using the second time/frequency resource; and communicating with the second relay station using the first time/frequency resource;

wherein the first and second time/frequency resources are both time periods or are both one or more frequencies.

29. The article of claim 28, wherein the first time/frequency resource is a first time period and the second time/frequency resource is a second time period that does not overlap with the first time period.

30. The article of claim 28, wherein the first time/frequency resource comprises a first frequency and the second time/frequency resource comprises a second frequency that does not overlap with the first frequency.

31. The article of claim 28, wherein:

the first and second time/frequency resources are used during a downlink communication;

the operation of communicating with the first relay station comprises transmitting to the first relay station;

the operation of communicating with the second relay station comprises transmitting to the second relay station;

the operation of scheduling the communications between the first relay station and the first subscriber station comprises scheduling a transmission from the first relay station to the first subscriber station; and the operation of scheduling the communications between the second relay station and the second subscriber station comprises scheduling a transmission from the second relay station to the second subscriber station.

32. The article of claim 28, wherein:

the first and second time/frequency resources are used during an uplink communication;

the operation of communicating with the first relay station comprises receiving from the first relay station;

the operation of communicating with the second relay station comprises receiving from the second relay station;

the operation of scheduling the communications between the first relay station and the first subscriber station comprises scheduling a transmission from the first subscriber station to the first relay station; and the operation of scheduling the communications between the second relay station and the second subscriber station comprises scheduling a transmission from the second subscriber station to the second relay station.

* * * * *